UNITED STATES PATENT OFFICE.

DAVID MARON, OF GENEVA, SWITZERLAND, ASSIGNOR TO SYNTHETIC PATENTS CO., INC., OF NEW YORK, N. Y., A CORPORATION OF NEW YORK.

DIACIDYLDIAMINOPHENOL COMPOUNDS.

1,159,403.     Specification of Letters Patent.     Patented Nov. 9, 1915.

No Drawing.     Application filed July 20, 1914. Serial No. 852,110.

*To all whom it may concern:*

Be it known that I, DAVID MARON, doctor of philosophy, chemist, a subject of the Emperor of Russia, residing at Geneva, Switzerland, have invented new and useful Improvements in Diacidyldiaminophenol Compounds, of which the following is a specification.

I have found that new derivatives of diaminophenol compounds can be obtained which have proved to be valuable antipyretics. The new compounds being chemically diaminophenol compounds containing in the amino groups two different acyl radicals are after being dried and pulverized crystalline powders soluble with difficulty in water, soluble in alcohol and acetone. They can be obtained by introducing into the free amino group of n-monoacidyldiaminophenol compounds an acidyl radical different from the first one.

In order to illustrate the new process more fully the following example is given, the parts being by weight: 209 parts of lactyl-para-phenetidid (melting point 118° C.) are dissolved in 400 parts of glacial acetic acid and nitrated by means of dilute nitric acid (golden yellow needles melting point 115—116° C.) By reduction the 3-amino-4-lactylphenetidid is obtained which crystallizes from water in colorless needles of the melting point 135—136° C. 50 parts of the base thus obtained are then treated with 50 parts of acetic acid anhydrid. The solid product enters into solution from which the 3-acetylamino-4-lactylaminophenetol separates. Needles of the melting point 139° C. soluble in hot water, easily soluble in alcohol and acetone. It has most probably the formula:

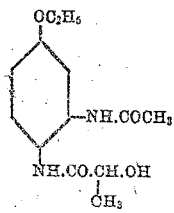

The 3-ethoxycarbonylamino-4-lactylaminophenetol having most probably the formula:

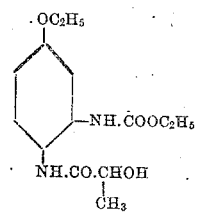

melts at 108—109° C. Needles soluble in hot water. The 3-acetylamino-4-ethoxycarbonylaminophenetol having most probably the formula:

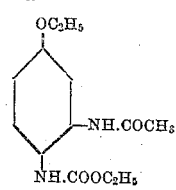

melts at 143—144° C., the 3-acetylamino-4-ethoxycarbonylaminophenol has most probably the formula:

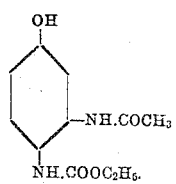

It crystallizes from dilute alcohol in the shape of colorless needles melting at 208—209° C. The 4-acetylamino-3-ethoxycarbonylaminophenetol has most probably the formula:

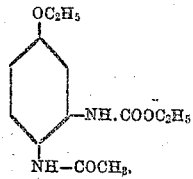

It crystallized in needles melting at 115° C. soluble with difficulty in cold water, easily soluble in alcohol and acetone.

I claim:—

1. As new products acidyl derivatives of diamino-phenol compounds containing in the two amino groups two different acyl radicals being valuable antipyretics, which are after being dried and pulverized crystalline substances soluble in organic solvents, scarcely soluble in water, substantially as described.

2. As new products acidyl derivatives of diamino-phenetols containing in the two amino groups two different acyl radicals being valuable antipyretics, which are after being dried and pulverized crystalline substances soluble in organic solvents, scarcely soluble in water, substantially as described.

3. As new products acidyl derivatives of diamino-phenol compounds, the first amino group containing an acyl radical and the second amino group an acetyl radical, said products being valuable antipyretics, which are after being dried and pulverized crystalline substances soluble in organic solvents, scarcely soluble in water, substantially as described.

4. As new products acidyl derivatives of diamino-phenol compounds, the first amino group containing a lactyl radical and the second amino group an acyl radical, said products being valuable antipyretics, which are after being dried and pulverized crystalline substances soluble in organic solvents, scarcely soluble in water, substantially as described.

5. As new products acidyl derivatives of diamino-phenetols, the first amino group containing an acyl radical and the second amino group an acetyl radical, said products being valuable antipyretics, which are after being dried and pulverized crystalline substances soluble in organic solvents, scarcely soluble in water, substantially as described.

6. As new products acidyl derivatives of 3.4-diamino-phenol compounds containing in the two amino groups two different acyl radicals being valuable antipyretics, which are after being dried and pulverized crystalline substances soluble in organic solvents, scarcely soluble in water, substantially as described.

7. As new products acidyl derivatives of 3.4-diamino-phenetols containing in the two amino groups two different acyl radicals being valuable antipyretics, which are after being dried and pulverized crystalline substances soluble in organic solvents, scarcely soluble in water, substantially as described.

8. As new products 4-acidyl-amino-3-acetylamino-phenol compounds being valuable antipyretics, which are after being dried and pulverized crystalline substances soluble in organic solvents, scarcely soluble in water, substantially as described.

9. As new products 4-acidyl-amino-3-acetylamino-phenetols being valuable antipyretics, which are after being dried and pulverized crystalline substances soluble in organic solvents, scarcely soluble in water, substantially as described.

10. As new products 4-lactylamino-3-acidylamino-phenol compounds, being valuable antipyretics, which are after being dried and pulverized crystalline substances soluble in organic solvents, scarcely soluble in water, substantially as described.

11. As new products 4-lactylamino-3-acidyl-amino-phenetols, being valuable antipyretics, which are after being dried and pulverized crystalline substances soluble in organic solvents, scarcely soluble in water, substantially as described.

12. As a new product the 3-actylamino-4-lactylaminophenetol having most probably the formula:

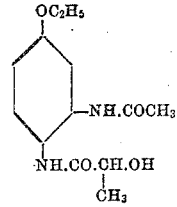

having proved to be a valuable antipyretic, which crystallizes in the shape of needles melting at 139° C., soluble in alcohol, acetone and hot water, substantially as described.

In testimony whereof I have set my hand in the presence of two subscribing witnesses.

DAVID MARON.

Witnesses:
 PIERRE HEHELIN,
 MARCEL JAUBERT.